United States Patent [19]

Dressler et al.

[11] Patent Number: 4,905,524

[45] Date of Patent: Mar. 6, 1990

[54] MEASURING DEVICE FOR DETECTING A DIFFERENTIAL ANGLE OF ROTATION OR DIFFERENTIAL TORQUE OF A RORSIONALLY STRESSED MACHINE PART

[75] Inventors: Klaus Dressler, Löchgau; Peter Pfeffer, Lauffen; Albrecht Schwarz, Gerlingen, all of Fed. Rep. of Germany

[73] Assignee: Robert Bosch GmbH, Stuttgart, Fed. Rep. of Germany

[21] Appl. No.: 271,751

[22] PCT Filed: Feb. 27, 1987

[86] PCT No.: PCT/DE87/00076

§ 371 Date: Sep. 14, 1988

§ 102(e) Date: Sep. 14, 1988

[87] PCT Pub. No.: WO87/05573

PCT Pub. Date: Sep. 24, 1987

[30] Foreign Application Priority Data

Mar. 14, 1986 [DE] Fed. Rep. of Germany ....... 3608521

[51] Int. Cl.[4] .............................................. G01L 3/02
[52] U.S. Cl. ................................. 73/862.32; 180/79.1
[58] Field of Search ........... 73/862.33, 862.32, 862.35, 73/862.19, 118.1, 862.08, 862.27, 862.34; 180/79.1

[56] References Cited

U.S. PATENT DOCUMENTS 2,930,247  3/1960  Zinn ..................................... 74/388

FOREIGN PATENT DOCUMENTS 174202   3/1986  European Pat. Off. .
2951148  4/1984  Fed. Rep. of Germany .
3742958  7/1988  Fed. Rep. of Germany ... 73/862.08
2319522  2/1977  France .

Primary Examiner—Jerry W. Myracle
Attorney, Agent, or Firm—Michael J. Striker

[57] ABSTRACT

An arrangement comprising a torsionally stressed machine part including two operatively connected torsional spring elements spaced from each other, extending parallel to each other, each spring element being subjected to a separate input torque and having a different spring constant, and a sensor located at a comparision point of the two spring elements for detecting a differential of two input angles of rotation of the two spring elements whereby a differential of the two input torques is determined.

3 Claims, 1 Drawing Sheet

MEASURING DEVICE FOR DETECTING A DIFFERENTIAL ANGLE OF ROTATION OR DIFFERENTIAL TORQUE OF A RORSIONALLY STRESSED MACHINE PART

BACKGROUND OF THE INVENTION

The invention relates to a measuring device for detecting a differential angle of rotation or torque of a torsionally stressed machine part. Such a known measuring device has two bodies of electrically conductive, non-magnetic work material which are arranged coaxially relative to a shaft, one of which bodies being connected with the shaft so as to be fixed for joint rotation therewith, the other body being rotatable relative to the shaft. Moreover, a coil is provided coaxially relative to the shaft and is arranged in the immediate vicinity of the two bodies, high-frequency alternating current passes through the coil. These two bodies comprise cut out portions whose mutual overlapping surface changes as the torsion angle occurring between the bodies increases, wherein the relative rotation of the two bodies can be detected for the purpose of measuring the change in impedance of the coil which occurs as a result of eddy currents induced in the bodies. This known device is relatively costly (DE-PS 29 51 148).

SUMMARY OF THE INVENTION

The object of the invention is to provide a measuring device, which allows an accurate detection of a torque differential of two torques acting jointly on an output shaft in a relatively simple design and compact manner of construction. The object of the invention is achieved by providing a machine part with two torsion spring elements arranged parallel to each other and having different spring constants and by providing a sensor located at a comparison point for detecting a differential of two input angles of rotation to thereby detect a differential of two input torques. The transmission of signals from a rotating machine part to a stationary machine part can be effected by various known transmission possibilities.

The invention as to its construction so to its mode of operation, together with additional objects and advantages thereof, will be best understood from the following description of the preferred embodiments with reference to the accompanying drawings.

DESCRIPTION OF THE PREFERRED EMBODIMENTS

Figure 1:
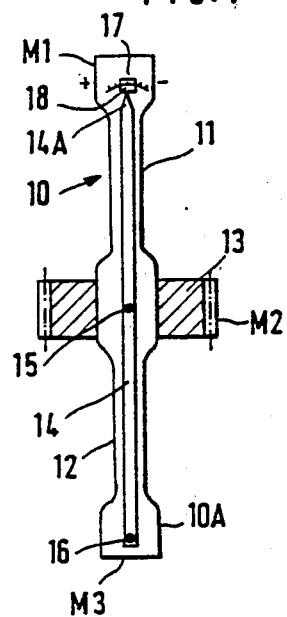
FIG. 1 shows a simplified view of a a first embodiment measuring device according to the present invention.

The embodiment according to FIG. 1 shows a principle of the measuring device according to the invention in its simplest construction, but in such a way that such a device would also be applicable in practice. The measuring device comprises a shaft 10, a torque M1 being introduced at the upper end of the latter. The shaft 10 comprises two neck portions 11, 12 having torsion spring constants C1 and C2. A drive gear 13, particularly a toothed gear, by which a servomotor, not shown, can deliver a torque M2 to the shaft 10, is fastened in the middle part of the shaft 10, that is between the neck portions 11 and 12. The torque M1, which is introduced at the upper end of the shaft 10, and the servo-torque M2, which is introduced via the drive gear 13, are added together. The sum M3 of these torques acts on the lower end of the shaft 10, i.e. at the output side 10A. A lever 14, which is rotatable in the middle of the shaft 10 at a point 15 and is supported in an articulated manner at the output side 10A of the shaft at a point 16, is arranged in the longitudinal direction of the shaft 10. The upper end 14A of the lever 14 projects over the center of rotation 15 until a comparison point 18 at the upper end of the lever 10, at which a sensor element 17 is located. The comparison point 18, together with the sensor element 17, serves to indicate the differential of two torques M1 and M3; in this connection, $M3 = M1 + M2$.

When a torque M1 is introduced in a clockwise direction at the upper end of the shaft 10, a differential angle occurs between the upper end 14A of the lever 14 and the sensor element 17 in the mathematically negative direction (see positive and negative signs at the sensor element) because of the spring constants C1 and C2 at the comparison point 18. If a drive torque M2, likewise acting in the clockwise direction, is now introduced via the drive gear 13, the differential angle then becomes zero due to the support of the lever 14 shown in the drawing when the two torques M1 and the sum $M3 = M1 + M2$ are in the same relation to one another as the two torsion spring constants C1 and C2. This is applicable with acceptable accuracy only with a narrow angular area around the zero point.

The relation between torque M1 and the sum $M3 = M1 + M2$ can be freely adjusted by means of the selection of the spring constants C1 and C2. The differential angle can be detected with a suitable sensor element.

The arrangement of the lever 14 in this embodiment can be conceived symbolically, but it is certainly conceivable to construct the shaft 10 as a hollow shaft and to arrange the lever in the interior of the shaft. However, e.g. the drive gear 13 can be a toothed segment which allows the lever to be arranged externally of the shaft. With a closed gear, a corresponding cut-out portion would be necessary in the gear, the lever penetrating through this cut-out portion.

Figure 2:
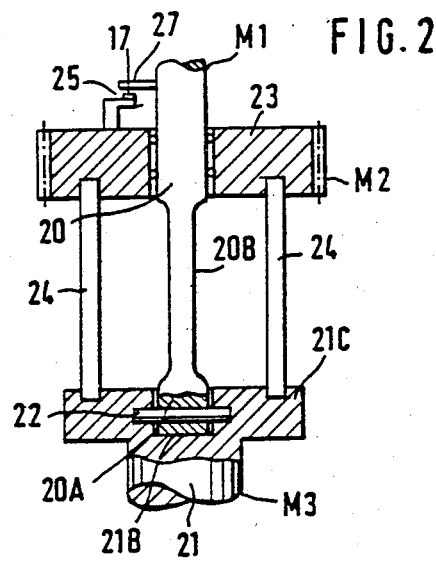
FIG. 2 shows a cross-sectional view of a second embodiment of a measuring device according to the present invention.

The measuring device of an embodiment according to FIG. 2 shows a practical application of the system previously described more in terms of principle. This instance particularly concerns an electromechanical servo-steering for a vehicle. The steering shaft is designated by 20; a steering wheel, not shown, is fastened at the upper end of the latter. The opposite end of the steering shaft 20A is connected by a locking pin 22 in a cylindrical recess 21B of an output shaft 21 for joint rotation therewith; the output shaft 21 leads to the steering gear unit.

A drive gear 23, which is supported on the steering shaft 20, is arranged concentrically with respect to the latter so as to be rotatable. A torsionally elastic connection in the form of a plurality of torsion bars 24 is produced between the drive gear 23 and the flange-like upper part 21C of the output shaft. These torsion bars extend parallel to the steering shaft 20 and are secured in the drive gear 23 and in the part 21C. The steering shaft 20 comprises an elongate neck portion 20B in its central area. The steering shaft 20 is, accordingly, the first torsion spring element, while the torsion bars 24 form the second torsion spring element. The first and second torsion spring elements have different spring constants C1 and C2. It can be seen by means of the described arrangement that the two torsion spring elements are arranged parallel to one another. The first torque M1, which is introduced at the steering shaft 20 from the steering wheel, is increased by the second torque M2 which is introduced via the drive gear 23 and delivered to the output shaft 21 together with the torque M1 and forms the cumulative moment M3. The drive gear 23 is preferably driven by an electric motor which provides for increase the moment M1 applied to the steering wheel. The torsion spring elements 20 and 24 are rotated by the introduced moments. The differential angle of rotation, as a measurement for the differential of the two introduced torques, is determined at a comparison point 25 by means of the sensor element 17 relative to a reference point 27 at the steering shaft 20. The comparison point and the sensor element again correspond to the parts according to the embodiment of FIG. 1.

The detection of the differential angle of rotation means that a zero position is indicated at the comparison point 25 as soon as the ratio of the delivered torques corresponds to the ratio of the torsion spring constants. The torques are thus determined and compared in a purely mechanical manner and only their differential is evaluated by suitable sensors.

The steering force reinforcement by the electric motor can be determined from the determined differential value. In addition, a shut-off signal can be provided in case of an error. Reliability is particularly great as a result of the purely mechanical comparison, since no electric transmitter signals need be compared. Of course, the individual torques M1 and M2, and accordingly also the cumulative moment M3, can also be determined by suitably arranged additional sensors.

Figure 3:
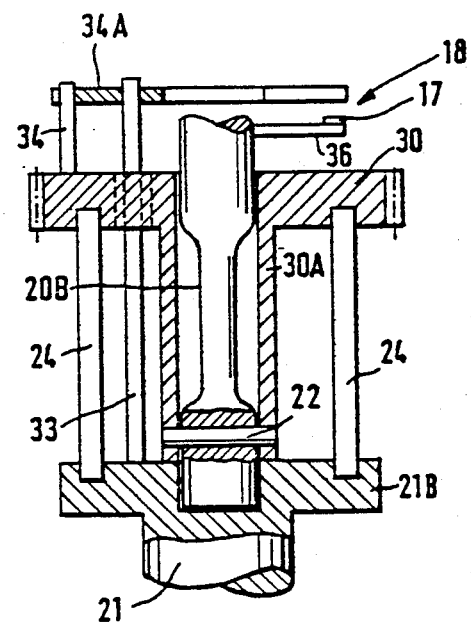
FIG. 3 shows a side-cross-sectional view of a a third embodiment of a measuring device according to the present invention.
Figure 3A:
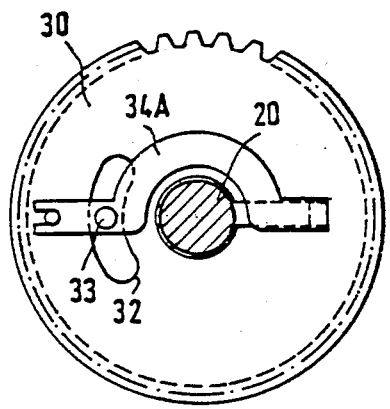
FIG. 3a shows a view in the direction of arrow 18 according to FIG. 3.

The measuring device of the embodiment according to FIG. 3 shows a similarity to those according to FIG. 2. The same parts as previously are designated by the same reference numerals. The substantial difference consists in that the drive gear—again, particularly a toothed gear—now designated by 30, is connected via a tubular extension 30A with a steering shaft 20 so as to be fixed to it for joint rotation therewith by the locking pin 22. The torque M1 is again delivered to the steering shaft, the torque M2 is delivered to the output shaft 21 by the drive gear 30 via the torsion bars 24. A slot 32, which is concentric to the steering shaft 20, is formed in the drive gear 30; a measuring rod 33, which is fastened at the flange-like rim 21B of the output shaft 21, penetrates through the slot 32. Moreover, a short rod 34 extends upward from the toothed gear 30, a curved stirrup 34A, which is guided around the steering shaft 20, specifically at an angle of 180°, being fastened at the rod 34. A reference point 36, which carries the sensor element 17, is again fastened at the steering shaft 20. The free end of the stirrup 34A located there, together with the sensor element 17, forms the comparison point 18. Again, the functioning of this device is the same as in the embodiment example according to FIG. 2, wherein the stirrup 34A swivels around the rod 33 during the rotation of the drive gear 30.

Different moment differentials are detected by means of a suitable selection of the spring constants C1 and C2. The partial moments can also be determined individually by means of a suitable arrangement of the sensor elements and further processed electrically later on.

While the invention has been illustrated and described with reference to specific embodiments of a measuring device for detecting a differential angle of rotation of a torsionally stressed machine part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement comprising a torsionally stressed machine part including two operatively connected torsionally loaded elements extending parallel to each other, each having an input angle of rotation and each being subjected to a separate input torque, and having a common comparison point; and means for detecting a differential torque acting on said machine part, said detecting means comprising a sensor located at said comparison point for detecting a differential of two input angles of rotation of said two elements, respectively; whereby a differential of the two input torques is determined, said two torsionally loaded elements being two separate torsional spring elements spaced from each other and having different spring constants.

2. An arrangement according to claim 1 further comprising a drive gear for applying an input torque to said machine part, said machine part including an output shaft, and said detecting means comprising a measuring rod extending parallel to said output shaft and a stirrup operatively connected with said drive gear, pivotable on said measuring rod, and cooperating with said sensor.

3. A machine part comprising two operatively connected torsion spring elements having different spring constants, respectively, spaced from each other and extending parallel to each other, each of said torsion spring elements having an input angle of rotation and being subjected to a separate input torque, said two spring elements having a common comparison point at which a differential of the two input angles of rotation is to be detected whereby a differential of the two separate input torques is to be determined.

* * * * *